Nov. 27, 1962

W. D. WHITAKER 3,065,954

TURBINE WHEEL EXDUCER STRUCTURE

Original Filed Sept. 11, 1953

INVENTOR.
WILLAM D. WHITAKER
BY
Herschel C. Omohundro
ATTORNEY

Nov. 27, 1962 W. D. WHITAKER 3,065,954
TURBINE WHEEL EXDUCER STRUCTURE
Original Filed Sept. 11, 1953 3 Sheets-Sheet 2
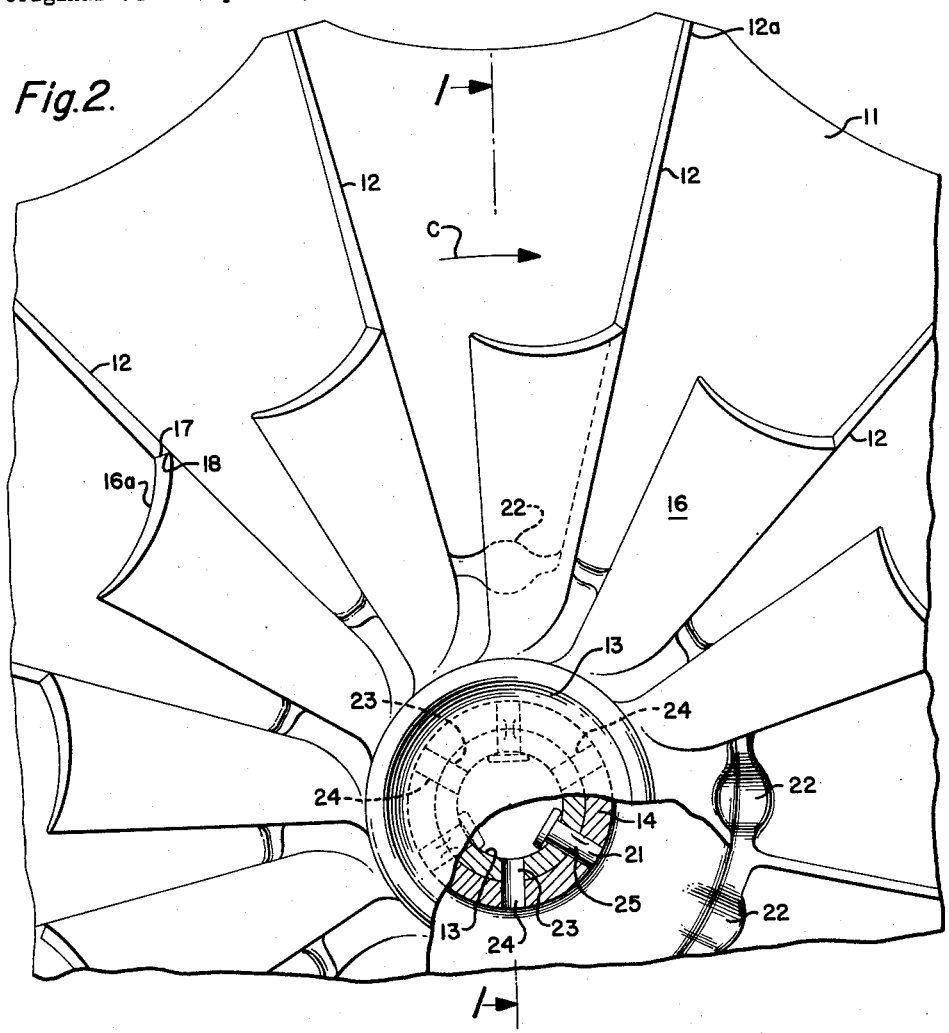
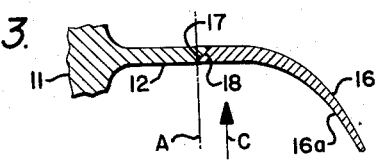
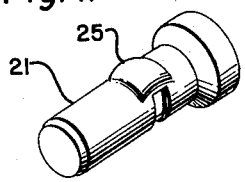
INVENTOR.
WILLIAM D. WHITAKER
BY
Herschel C. Omohundro
ATTORNEY Nov. 27, 1962 W. D. WHITAKER 3,065,954
TURBINE WHEEL EXDUCER STRUCTURE
Original Filed Sept. 11, 1953 3 Sheets-Sheet 3

INVENTOR.
WILLIAM D. WHITAKER
BY
Herschel C. Omohundro
ATTORNEY

United States Patent Office 3,065,954
Patented Nov. 27, 1962

3,065,954
TURBINE WHEEL EXDUCER STRUCTURE
William D. Whitaker, Azusa, Calif., assignor to The Garrett Corporation, Los Angeles, Calif., a corporation of California
Original application Sept. 11, 1953, Ser. No. 379,561, now Patent No. 2,859,933, dated Nov. 11, 1958. Divided and this application Apr. 21, 1958, Ser. No. 729,734
9 Claims. (Cl. 253—39)

This invention relates to bladed wheels for use with elastic fluids and more particularly to a turbine or impeller wheel having means for damping vibration of its blades.

This is a true division of my application Serial No. 379,561, filed September 11, 1953, now Patent No. 2,859,933 issued November 11, 1958, entitled Turbine Wheel Exducer Structure.

During operation of conventional turbine or impeller wheels, cracking of the blades sometimes occurs as the result of fatigue failure occasioned by vibrational stresses.

When blades of a turbine wheel are permitted to vibrate at a resonant frequency thereof, the amplitude of the natural frequency of vibration increases to such an extent that fatigue cracking may result. This condition is particularly dangerous when it occurs in a wheel operating at high rotational speed. Various prior art devices have been employed in an attempt to alleviate the effects of vibration on turbine wheel blades. Such devices have embodied preloaded, axially abutted blades, which eventually relax due to the effects of high temperatures, and consequently become inoperative. Vibration damping devices such as ball bearing blade couplers have also been contemplated. Furthermore, rivets loosely supported in wheel blades are known to be useful in blade vibration damping. The two latter devices, however, have insufficient bearing area upon the blades, and are therefore subject to short life, and furthermore, are very dangerous when they fail due to high centrifugal loads acting thereon. It is accordingly recognized that any device employed for damping of vibration in the blades of turbine or compressor wheels must be simple and durable even at high rotational speeds, and also must be economical to produce.

It is an object of this invention to provide a turbine or compressor wheel having separate hub portions, each being provided with extending blades engaging the blades of the adjacent hub portion in axially overlapping relationship, whereby the wheel structure is simple to manufacture and also very durable in operation.

Another object of the invention is to provide means for damping vibrational stresses which may occur in rotating wheel blades, which means is very simple to assemble and maintain in proper operating condition.

A further object of the invention is to provide a bladed wheel for use with elastic fluids having a plurality of individual hub sections, each carrying blades which overlap corresponding adjacent hub blades near the extremities thereof; whereby the blades are effectively restrained against excessive vibration at their natural frequencies.

Another object of the invention is to provide, for use in a turbine or compressor, a bladed wheel having a plurality of bladed hub portions, adjacent hub blades of which overlap other blades substantially along the direction of rotation thereof, whereby motive forces applied to the blades by the fluid cause them to firmly engage and damp vibration of each other.

Still another object of the invention is to provide a bladed wheel wherein overlapping blade portions extend over an area sufficient to provide a durable damping structure.

Still another object of the invention is to provide means for reducing combined thermal and vibrational stresses in bladed wheels.

Another object of the invention is to provide a bladed wheel for centripetal operation having gas conducting passages within the wheel hub to permit more rapid heating thereof, which tends to reduce the radial temperature gradient which may be created in the wheel during initial heating of its back disk.

A further object of the invention is to provide a bladed wheel having a thermally responsive ring positioned near the back disk thereof, adapted to thermally influence the wheel and thereby reduce the radial temperature gradient from the periphery to the hub thereof during cycles of heating and cooling of the wheel.

Another object of the invention is to provide a radially bladed wheel having novel means for reducing the radial temperature gradient in the back disk thereof.

These and other objects will be apparent from the following specification and accompanying drawings in which:

FIG. 2 is a fragmentary view taken on line 2—2 of FIG. 1 showing portions broken away and in section;

FIG. 3 is a fragmentary sectional view taken from line 3—3 of FIG. 1;

FIG. 4 is a perspective view of a wheel hub connection pin utilized in the wheel structure of FIG. 1;

Figure 1:
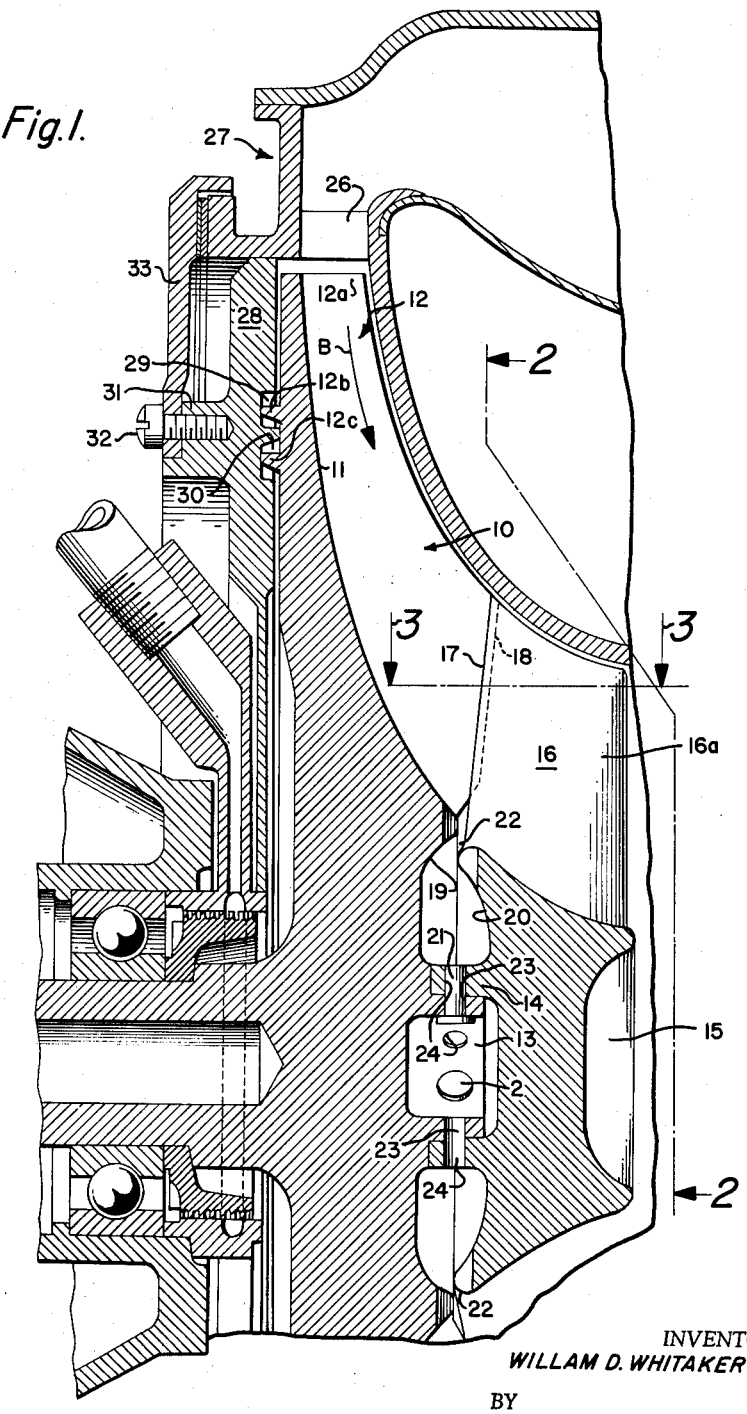
FIGURE 1 is a fragmentary axially sectional view taken on line 1—1 of FIG. 2 of an elastic fluid centripetal turbine wheel shown positioned in a conventional turbine housing and having thermal gradient controlling means together with wheel blade vibration damping means.

A turbine wheel 10 of centripetal configuration, as shown in FIG. 1 of the drawings, is provided with a back disk 11 gradually tapering in cross section from the hub to the periphery of the wheel. Integral with the back disk 11 are substantially radially extending blades 12. The back disk 11, at its hub portion, is provided with a hollow cylindrical extension 13 engaged telescopically by a hollow cylindrical connection portion 14 of a separate hub section 15 having integral blades 16. The blades 12 and 16 overlap and bear upon each other, in the direction of rotation thereof, as shown best in FIGS. 1 and 3. As illustrated in FIG. 3, the blades 12 and 16 overlap each other in a plane of rotation A at their engaging edge surfaces 17 and 18, respectively, at an angle of substantially 45 degrees.

It will be noted that the surface 17 of the blade 12, as shown in FIG. 3, provides an abutment for the surface 18 of the blades 16 in the direction of rotation, which is indicated by the arrow C. The overlapping portions of the blades 12 and 16 afford sufficient bearing area to insure durability of the structures under vibration and also to provide efficient damping engagement of the blades of both hub portions 11 and 15. Due to the proportional relationship of the mass and structure of the blades 12 and 16, they vibrate at different natural frequencies, whereby interengagement thereof at their surfaces 17 and 18 prevents development of a resonant condition therein. In this manner, vibrational amplitudes of the blades do not attain sufficient proportions to cause critical stresses therein. The angularly disposed overlapping portions of the blades 12 and 16, as shown in FIG. 3, provide for substantially flush disposition of the blades at their joinder, whereby they promote smooth, uniform flow of gas from one blade to the other.

The wheel 10, back disk 11, and hub 15 are provided with recesses 19 and 20, respectively, which communicate with each other and with the passages between adjacent blades 12 and 16. The recesses 19 and 20, therefore, provide openings communicating with the passages between the blades and with the telescopically connected extensions 13 and 14 of the back disk 11 and hub 15, respectively.

As shown in FIG. 2, the communicating recess portions 19 and 20 form openings 22 which are disposed between the blades of the wheel and which are in alignment with three pins 21. Before assembly of the telescopic connections 13 and 14, the pins 21 are inserted in openings 23 in the telescopic cylindrical extension 13; then the extensions 13 and 14 are telescopically engaged by axial movement of the hub 15 relative to the back disk 11, whereupon the openings 23 are aligned with openings 24 in the cylindrical telescopic extension 14 of the hub 15, permitting a tool to be inserted through one of the openings 22 and through an opening 24 for driving each pin into an opposite opening 24 aligned therewith.

The pins 21, as shown in FIG. 4, are provided with slight projections 25 which are swaged by a driving fit thereof into the telescopic extensions 13 and 14, whereby the pins 21 are securely fixed in position, as shown in FIG. 1.

The openings 22 intermediate the wheel blades permit access of hot gases to the recessed portions 19 and 20 communicating with the relatively thick hub portion of the back disk 11 near its axis. Such flow of hot gases, during starting of the turbine, heats the hub portion of the back disk 11 in order to reduce the thermal gradient between the periphery and the axis of the back disk.

The turbine wheel, composed of the back disk 11, hub 15, and the blades 12 and 16, is of the centripetal type wherein the blades 16 are curved, as shown in FIG. 3. The blades 16 are provided with concave surfaces 16a adapted to be contacted by the gas flowing in the direction indicated by arrows B in FIG. 1. The peripheral portions 12a of the blades 12 of the turbine wheel are arranged to rotate in close relation to conventional stationary nozzle vanes 26.

Positioned internally of a turbine casing 27 is a fixed ring 28 which is disposed in close proximity to the side of the back disk 11 opposite the blades 12, all as shown best in FIG. 1. The ring 28 is contacted by hot gas which spills over the periphery of the turbine wheel. The mass of the ring 28 is sufficient to provide for heat exchange with adjacent portions of the back disk 11 during heating and cooling of the turbine wheel. The ring 28 extends inwardly from the periphery of the wheel a distance of approximately one third or more of the radius thereof. The peripheral portion of the back disk 11 is considerably thinner than its hub portion, and hence the mass of the outer annular portion of the ring 28 is preferably made greater than that of a corresponding adjacent annular portion of the wheel back disk. The ring, therefore, assists in reducing the thermal gradient from the periphery of the wheel to its hub portion, which would otherwise occur during starting or stopping of the turbine. The ring 28 is provided with annular grooves 29 and 30 in which annular ribs 12b and 12c of the back disk 11 are disposed. The cooperative relationship of the grooves 29 and 30 and of the ribs 12b and 12c provides a labyrinth seal intermediate the back disk 11 and the ring 28 which prevents excessive flow of hot gas inwardly along the back side of the wheel toward its axis. The ring 28 is provided with an annular, rearwardly extending boss portion 31 into which are screw-threaded bolts 32 which secure the ring 28 to a side wall 33 secured to the turbine casing 27.

In operation, hot gas flows through the nozzles 26 and intermediate the blades 12 and 16. Gas traveling at high velocity intermediate the blades is turned on the concave surfaces 16a of the blades 16. Such turning of the gases creates thrust on the blades 16 in the direction of rotation, as indicated by the arrow C in FIG. 3. When the blades 16 are thrust in the direction of the arrow C, they intimately engage the blades 12 in the direction of rotation. The blades 12 and 16 each vibrate at different natural frequencies and during engagement of their surfaces 17 and 18, respectively, they tend to dampen vibration of each other, thereby preventing a resonant condition in which the amplitude might reach damaging proportions.

It will be obvious that the engaged relationship of the blades 12 and 16 is applicable to the wheel structures of compressors wherein blade vibration damping may be necessary.

When the turbine is started, the flow of hot gas through the nozzles 26 causes the periphery of the back disk 11 to be heated quite rapidly. The ring 28, disposed in close proximity to the back disk 11, tends to absorb heat from the peripheral back disk portion, at the same time thus reducing its tendency to heat faster than the hub portion. The hub portion of the back disk near the axis of the wheel is heated by gas entering the openings 22, thus further reducing the initial thermal gradient from the periphery of the wheel to its hub portion. Such reduction in the initial thermal gradient materially reduces thermal stresses in the back disk 11 during starting of the turbine.

When the flow of hot gas through the nozzles 26 is shut off, the relatively thin peripheral portion of the back disk 11 would tend to cool more rapidly than the hub portion of the wheel. Such rapid cooling of the periphery of the back disk 11 is prevented by the ring 28. The ring radiates heat to the peripheral back disk portion and consequently the hub portion has sufficient time to cool to a certain extent before the temperature of the peripheral back disk portion has been reduced to a value which would cause critical internal stresses. Thus, during the cooling period, the temperature gradient in the turbine wheel from its periphery to its hub portion is materially reduced. It is believed that the ring 28, reducing the thermal stresses in the wheel, and the vibration damping structure heretofore described, cooperate to prevent cracking of the wheel blades and the back disk.

Figure 5:
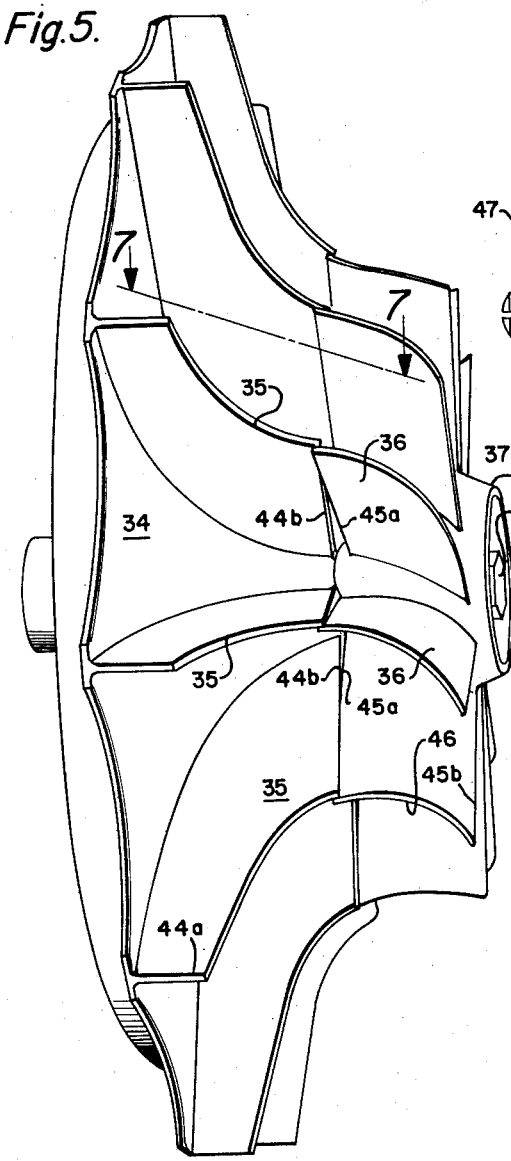
FIG. 5 is a perspective view of a bladed wheel having modified blade damping means thereon.
Figure 6:
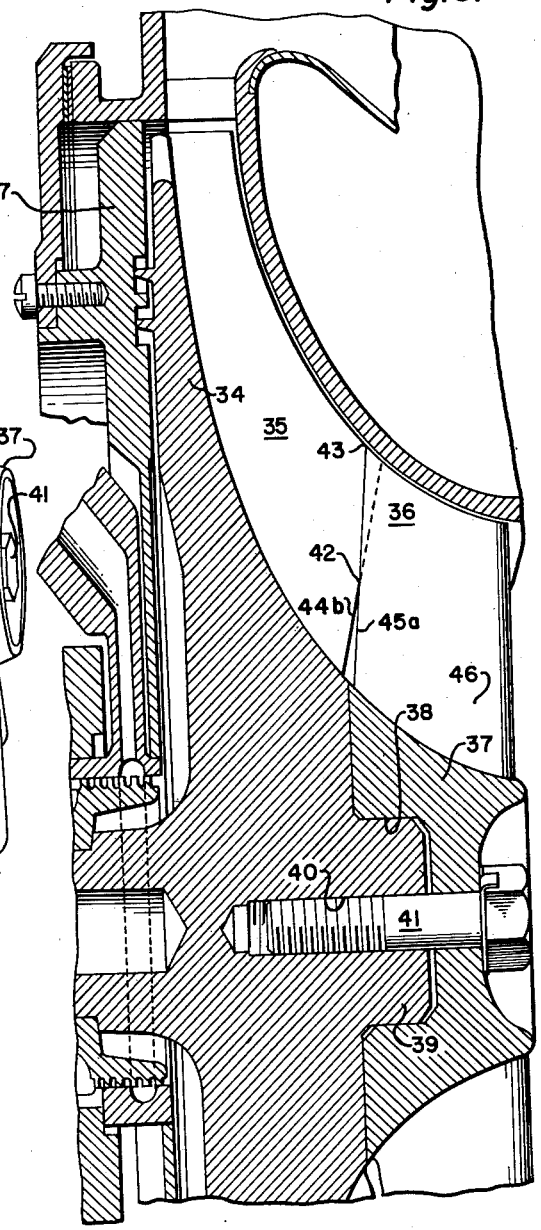
FIG. 6 is a sectional view of the wheel shown in FIG. 5 disposed in a conventional turbine housing similar to that shown in FIG. 1.
Figure 7:
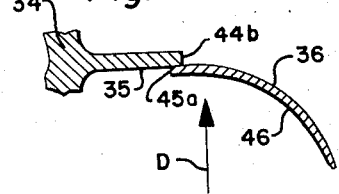
FIG. 7 is a fragmentary sectional view taken from line 7—7 of FIG. 5 and showing the overlapping blade vibration damping structure of the wheel of FIG. 5.

In the modified form of the invention, as shown in FIGS. 5, 6, and 7, the turbine wheel is provided with a back disk 34 having integral blades 35 arranged in overlapping relation with blades 36 on a blade hub member 37. The hub 37 is provided with a concentric recess portion 38 surrounding an extending concentric stub 39 of back disk 34. A bolt 41 is screw-threaded in a threaded concentric hole 40 in the back disk 34. The bolt 41 exerts axial clamping force on the hub 37 for retaining it securely connected to the back disk 34. Adjacent blades 35 and 36 are arranged in offset overlapping relationship to each other, as shown best in FIGS. 5 and 7. The offset overlapping portions of the blades 35 and 36 are disposed near the outer extremities thereof; thus, the blades 36 overlap the blades 35 along approximately half their length. As shown in FIG. 6, the blades 35 and 36 overlap between the points 42 and 43. As illustrated, each blade 35 has a leading edge 44a, i.e. portion facing the incoming fluid, and a trailing edge 44b, while each blade 36 has a leading edge 45a and a trailing edge 45b. Adjacent edges 44b and 45a of the blades 35 and 36, respectively, are disposed at an acute angle to each other to provide for offset overlapped arrangement. The blades 36 are provided with concave surfaces 46 adapted to be contacted by gas flowing between the blades. The flow of gas creates thrust in the direction of rotation, as shown by the arrow D in FIG. 7, forcing the blades 36 against the blades 35 at their overlapping edges.

A ring 47 is positioned in close proximity to the back disk 34, as shown in FIG. 6. Ring 47 is similar in structure and operates in the manner of the ring 28 hereinbefore described and shown in FIG. 6. Ring 47 is similar in structure and operates in the manner of the ring 28 hereinbefore described and shown in FIG. 1.

In the operation of the modified form of the invention shown in FIGS. 5, 6, and 7, gas flows through the turbine wheel and around the ring 47 in a similar manner to that hereinbefore described and shown in FIGS. 1, 2, and 3. When gas flows between the blades 35 and against the concave surfaces 46 of the blades 36, the overlapping portions of the blades 35 and 36, as shown in FIG. 7, are engaged. Such engagement is caused by thrust of the gas on the blades 36 which forces them in the direction of rotation and into engagement with the blades 35, thus damping vibration.

I claim:

1. A wheel for operation with elastic fluids comprising: a pair of axially aligned rotatable hub portions having a plurality of blade sections with smooth side surfaces radiating therefrom, the angle of radiation of the blade sections of one hub portion being slightly different than that of the blade sections of the other hub portion to dispose portions of complementary blade sections in laterally offset relationship, the latter portions of the blades on one hub portion extending axially of the wheel beyond such portions of the blades on the other hub portion to cause an axial overlapping of such blade sections, the respective overlapping portions of the blade sections being in engagement with one another to dampen the vibration characteristic of the blades.

2. A wheel for operation with elastic fluid comprising: first and second hub sections disposed in axially aligned abutting relationship; a plurality of smooth-sided blade portions extending substantially radially and axially from the first hub section and complemental blade portions extending substantially radially from the second hub section, the blade portions on said first hub section projecting angularly over the second hub section and slightly beyond the adjacent edges of the blade portions thereon, the blade portions on one hub section being offset relative to the blade portions on the other hub section to cause an overlapping thereof; and means for retaining the hub sections in abutting relation with the complemental blade portions in overlapping relation.

3. A wheel for operation with elastic fluid comprising: first and second hub sections disposed in axially aligned abutting relationship; a plurality of smooth-sided blade portions extending substantially radially and axially from the first hub section and complemental blade portions extending substantially radially from said second hub section, the blade portions on one of said hub sections projecting angularly over the other hub section and slightly beyond the adjacent edges of the blade portions thereon, the blade portions on one hub section being offset relative to those on the other hub section to cause an overlapping engagement thereof; and means for retaining the hub sections in abutting relation with the complemental blade portions in overlapping relation, said means having telescoping portions on said hub sections; and securing means engaged with said telescoping portions to prevent separation thereof.

4. A wheel for operation with elastic fluid, said wheel comprising: a plurality of axially aligned, relatively fixed, rotatable hub sections; a first plurality of blades having leading and trailing edges and extending generally radially from one of said hub sections; a second plurality of blades having leading and trailing edges and extending generally radially from a hub section adjacent said one hub section and in complemental relationship with said first plurality of blades so as to define pairs of complemental blades, with complemental blades of said adjacent hubs being indexed angularly about the axis of wheel rotation so that their adjacent edges are fully offset; said blades having front and back faces substantially smooth from leading to trailing edges thereof; and each pair of complemental blades having adjacent portions of the smooth front face of one blade and the smooth back face of the other in full overlapping relationship for vibration dampening engagement.

5. A wheel for operation with elastic fluid as described in claim 4, wherein blades of said first plurality of blades have a resonant frequency different than that of blades of said second plurality of blades and wherein parts of the front and back faces, respectively, of complemental blades are in overlapping engagement so as to dampen the vibration of said complemental blades.

6. A wheel for operation with elastic fluid as described in claim 4, wherein blades of said first plurality of blades project beyond the adjacent end of said adjacent hub section to overlap complemental blades of said second plurality of blades.

7. A wheel for operation with elastic fluid as described in claim 4, wherein the adjacent edges of complemental blades are disposed at an acute angle relative to each other so as to cause overlapping of adjacent outer extremities of said complemental blades.

8. A wheel for operation with elastic fluid as described in claim 4, wherein said first plurality of blades is offset from said second plurality of blades in a direction opposite to the direction of rotation of said wheel, and wherein said blades of said first plurality of blades curve away from said direction of rotation of said wheel so that fluid pressure applied to curved portions of the blades of said first plurality of blades tend to cause the overlapping portions of the blades of said first plurality of blades to more firmly engage the overlapped portions of the blades of said second plurality of blades.

9. A wheel for operation with elastic fluid as described in claim 4, wherein the blades of said first plurality of blades have a resonant frequency different than that of the blades of said second plurality of blades, wherein the adjacent edges of complemental blades are disposed at an acute angle relative to each other to cause their mutual overlapping, and wherein said wheel includes means for preventing separation of said hub sections.

References Cited in the file of this patent

UNITED STATES PATENTS

| 1,250,005 | Phillips | Dec. 11, 1917 |
| 1,258,462 | Rice | Mar. 5, 1918 |
| 1,653,391 | Corless | Dec. 20, 1927 |
| 1,959,220 | Robinson | May 15, 1934 |
| 2,405,283 | Birmann | Aug. 6, 1946 |
| 2,482,462 | Browne | Sept. 20, 1949 |
| 2,625,365 | Moore | Jan. 13, 1953 |
| 2,646,920 | Butcher | July 28, 1953 |
| 2,664,240 | Gorton | Dec. 29, 1953 |
| 2,803,430 | Wheaton | Aug. 20, 1957 |
| 2,859,933 | Whitaker | Nov. 11, 1958 |

FOREIGN PATENTS

| 668,093 | Great Britain | Mar. 12, 1952 |

UNITED STATES PATENT OFFICE
CERTIFICATE OF CORRECTION

Patent No. 3,065,954                                    November 27, 1962

William D. Whitaker

It is hereby certified that error appears in the above numbered patent requiring correction and that the said Letters Patent should read as corrected below.

Column 5, lines 4, 5 and 6, strike out "Ring 47 is similar in structure and operates in the manner of the ring 28 hereinbefore described and shown in FIG. 6.".

Signed and sealed this 7th day of May 1963.

(SEAL)
Attest:

ERNEST W. SWIDER
Attesting Officer

DAVID L. LADD
Commissioner of Patents